(12) United States Patent
Mirescu

(10) Patent No.: US 7,141,904 B2
(45) Date of Patent: Nov. 28, 2006

(54) GEAR REDUCTION UNIT AND GEARED MOTOR CONNECTOR

(75) Inventor: Dan Mirescu, Caen (FR)

(73) Assignee: ArvinMeritor Light Vehicle Systems-France, Sully-sur-Loire (FR)

( * ) Notice: Subject to any disclaimer, the term of this patent is extended or adjusted under 35 U.S.C. 154(b) by 6 days.

(21) Appl. No.: 10/762,587

(22) Filed: Jan. 22, 2004

(65) Prior Publication Data

US 2004/0178687 A1    Sep. 16, 2004

(51) Int. Cl.
*H02K 7/00* (2006.01)

(52) U.S. Cl. ............................................ 310/99

(58) Field of Classification Search ................ 310/99, 310/89, 68 B
See application file for complete search history.

(56) References Cited

U.S. PATENT DOCUMENTS

| | | | |
|---|---|---|---|
| 4,899,145 A * | 2/1990 | Okuda et al. ............... 341/15 |
| 4,987,415 A * | 1/1991 | Santos et al. ............... 341/15 |
| 5,089,817 A * | 2/1992 | Santos et al. ............... 341/15 |
| 5,300,883 A * | 4/1994 | Richeson ............... 324/207.22 |
| 5,528,093 A * | 6/1996 | Adam et al. ............... 310/89 |
| 5,984,695 A * | 11/1999 | Riehl et al. ............... 439/76.1 |
| 6,107,713 A | 8/2000 | Hulsmann et al. |
| 6,201,326 B1 * | 3/2001 | Klappenbach et al. ..... 310/75 R |
| 6,249,068 B1 * | 6/2001 | Knopp ............... 310/71 |
| 6,317,332 B1 * | 11/2001 | Weber et al. ............... 361/760 |
| 6,407,543 B1 * | 6/2002 | Hagio et al. ............ 324/207.25 |
| 6,701,892 B1 * | 3/2004 | Wayama et al. ............. 123/399 |
| 6,707,183 B1 * | 3/2004 | Breynaert et al. ......... 310/68 B |
| 6,713,913 B1 * | 3/2004 | Hager et al. ............... 310/89 |
| 6,742,413 B1 * | 6/2004 | Schwital et al. ........... 74/606 R |
| 6,756,711 B1 * | 6/2004 | Matsuyama et al. ...... 310/68 R |

FOREIGN PATENT DOCUMENTS

| | | | |
|---|---|---|---|
| DE | 10125582 A1 * | 12/2002 |
| JP | 05157506 A * | 6/1983 |
| JP | 2001268841 A * | 6/2001 |
| JP | 2001251808 | 9/2001 |
| JP | 2001251808 A * | 9/2001 |

* cited by examiner

*Primary Examiner*—Joseph Waks
(74) *Attorney, Agent, or Firm*—Carlson, Gaskey & Olds

(57) ABSTRACT

A gear reduction unit includes an electric motor that rotatably drives a drive shaft, a magnet on the drive shaft and a Hall effect sensor close to the magnet. The sensor is supported by a connector transmitting power to the electric motor. The connector may be removable. The connector has a printed circuit board defining a plane, with the sensor being offset relative to the plane defined by the circuit board.

11 Claims, 2 Drawing Sheets

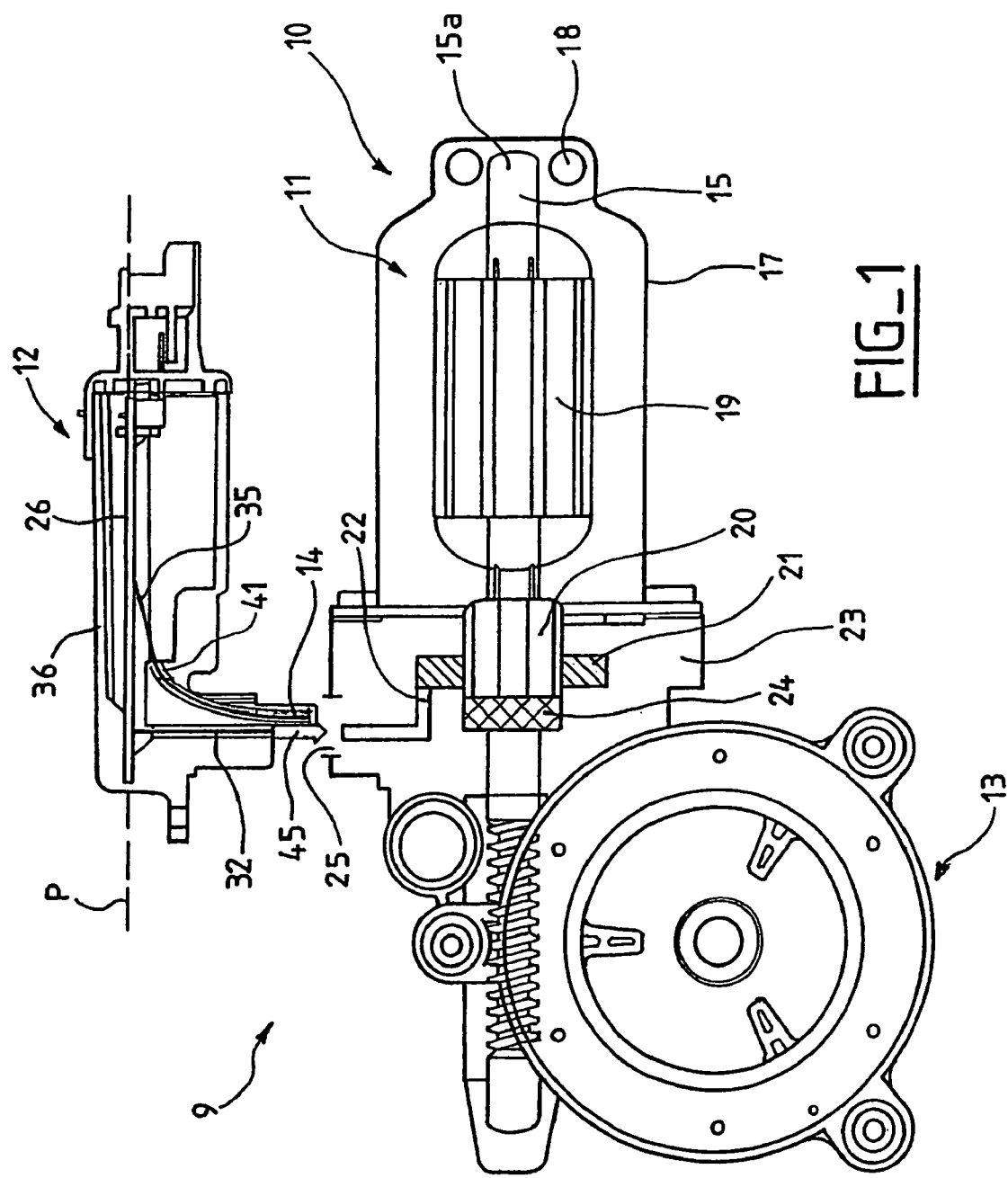
FIG_1

FIG_2
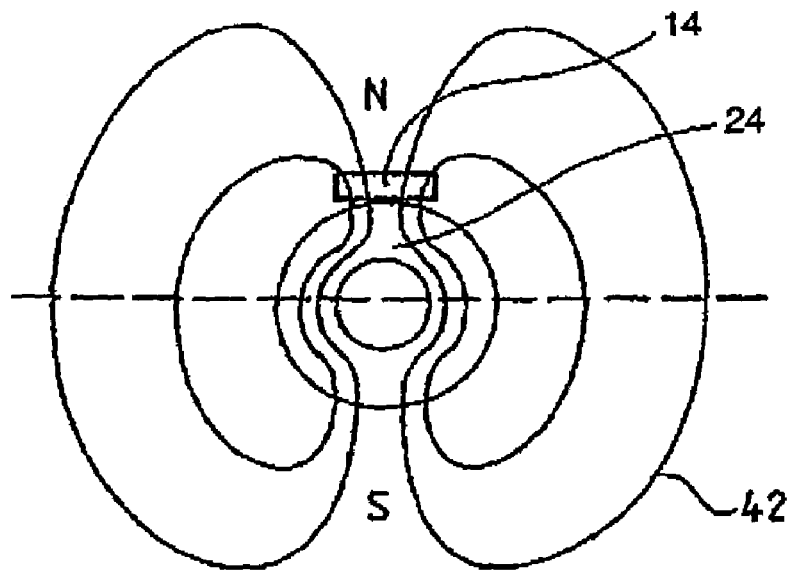
FIG_3
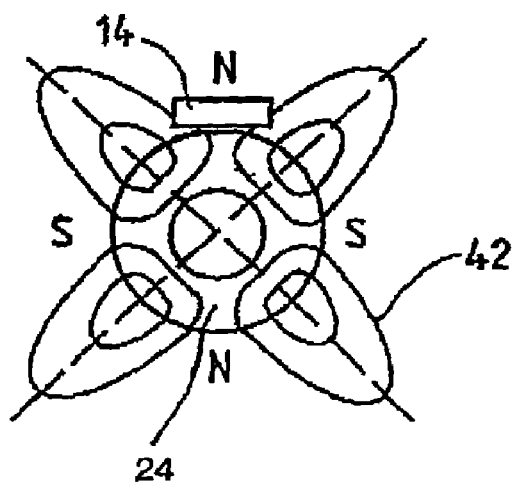

GEAR REDUCTION UNIT AND GEARED MOTOR CONNECTOR

REFERENCE TO RELATED APPLICATIONS

The present invention claims the benefit of PCT Application No. PCT/FR03J/01521, filed May 20, 2003, which claims the benefit of French Patent Application No. 02 06 213, filed May 22, 2002.

TECHNICAL FIELD

The present invention relates to a gear reduction unit and a connector for such a unit.

BACKGROUND OF THE INVENTION

Geared motors are often linked to a control system using motor speed and/or position parameters. The control system receives these parameters from a Hall effect sensor linked to a magnet that is designed to deliver a magnetic field to the sensor. The characteristics of the magnetic field depend on the speed and/or position of the drive shaft.

One proposed structure mounts the magnet on the drive shaft of a geared motor and fixes the Hall effect sensor to the control system or a connector. A magnetic flux conductor forming a flux concentrator is inserted between the magnet and the sensor, allowing the magnetic flux to be guided toward the sensor. This proposed solution, however, undesirably allows part of the flux to be lost and not be guided toward the Hall effect sensor, which reduces the quality of the motor parameter detection. Moreover, the installation of the flux concentrator makes the production of the connector more complex.

There is a desire for a simpler gear reduction unit configuration to overcome the problems of the proposed structure.

SUMMARY OF THE INVENTION

The invention is directed to a gear reduction unit comprising an electric motor that rotatably drives a drive shaft, a magnet on the drive shaft and a Hall effect sensor close to the magnet. In one embodiment, the sensor is supported by a connector that carries current to the electric motor. The connector may be removable.

In one embodiment, the connector comprises a printed circuit board defining a plane, with the sensor being offset relative to the plane defined by the circuit board.

The invention also is directed to a gear reduction unit connector comprising a printed circuit board defining a plane and a Hall effect sensor, with the sensor being offset relative to the plane defined by the circuit board. For example, the Hall effect sensor may be disposed in a guide hole in the circuit board. The connector may also comprise electrical contacts.

Other characteristics and advantages of the invention are given in the following detailed description according to embodiments of the invention, given as illustrative examples only and with reference to the figures.

BRIEF DESCRIPTION OF THE DRAWINGS

FIG. 1 shows a cross-section of a gear reduction unit;
FIGS. 2 and 3 show the detection of the magnetic field of a magnet by a sensor.

DETAILED DESCRIPTION OF THE EMBODIMENTS

The invention is generally directed to a gear reduction unit comprising an electric motor driving a drive shaft in rotation, a magnet on the drive shaft and a sensor, such as a Hall effect sensor, close to the magnet. In one embodiment, there is a distance of 4 mm or less between the sensor and the magnet, and preferably a distance of 2 mm between the sensor and the magnet.

According to one embodiment, the sensor is supported by a connector that also delivers electric current to the electric motor. Preferably, the connector is removable. The connector may comprise a printed circuit board defining a plane, with the sensor being offset relative to the plane.

The invention is also directed to a geared motor connector comprising a printed circuit board defining a plane and a Hall effect sensor, with the sensor being offset relative to the plane. For example, the Hall effect sensor is in a guide hole in the circuit board. The connector also comprises electrical contacts To detect the operating parameters of a motor, one embodiment of the invention uses a Hall effect sensor that is brought close to a magnet acting as a magnetic field source whose characteristics are linked to motor operating parameters. The Hall effect sensor is at a distance such that the sensor can detect the magnetic field without using an intermediate unit between the magnet and the sensor.

Referring now to the drawings, FIG. 1 shows a gear reduction unit 9 comprising a geared motor 10 and a connector 12 connected to the geared motor.

The geared motor 10 comprises an electric motor 11 that rotatably drives a reduction gear 13 by means of a drive shaft 15. The motor 11 comprises a stator 17 that forms a casing that houses permanent magnets (not shown). The stator 17 supports one end 15a of the drive shaft 15 of a rotor 19 by means of a bearing 18. The rotor 19 comprises windings wound around stacked laminations in any known manner. A collector 20 is electrically connected to the rotor 19 and receives supply current for the motor 11 by means of brushes 21. The supply current is sent to the motor 11 through supply terminals 22.

The geared motor 10 also comprises a housing 23 rigidly fixed to the stator 17 and that supports the second end of the drive shaft 15 by means of a second bearing assembly (not shown). The section of the drive shaft 15 located on the side of the second shaft end is configured as a threaded rod forming a worm, which drives the reduction gear 13.

The gear reduction unit 9 also comprises a magnet 24 on the drive shaft 15. The magnet 24 is fixed to the drive shaft 15 so that it follows the movements of the drive shaft. The magnetic field generated by the magnet 24 therefore reflects the movements of the shaft and the electric motor 11. The magnet 24 is thus rotatably driven at the rotating speed of the shaft 15.

According to the embodiment shown in FIG. 1, the magnet 24 is a magnetic ring on the drive shaft 15. The polarization of the magnet 24 is transverse to the longitudinal axis of the shaft 15.

A sensor 14 is arranged in the gear reduction unit 9 so that it detects the magnetic field of the magnet 24. The magnetic field characteristics convey the speed and/or position of the shaft 15. The sensor 14 thus provides information about the operation of the drive shaft 15. The sensor 14 is arranged close to the magnet 24 so that the sensor 14 can detect the magnetic field of the magnet 24 without using an intermediate unit to assist the detection. The closer the sensor 14 is to the magnet 24, the better the detection of the magnetic field by the sensor 14. The proximity of the sensor 14 and the magnet 24 with respect to each other allows the sensor 14 to detect the magnetic field at its source where the field is strong, increasing the useful flux passing through the sensor and reducing field losses due to leaks. Thus, a less sensitive Hall effect sensor or a weaker magnet can be used in the unit without sacrificing detection performance. Another advantage is that the inventive structure avoids the need to use a concentrating device, such as a magnetic flux concentrator, thereby making the production of the gear reduction unit according to the invention less complex.

FIGS. 2 and 3 illustrate examples of how the magnetic field of the magnet 24 is detected by the sensor 14. FIG. 2 shows the magnet 24 with two poles, North and South, with magnetic field lines 42 extending from one pole to the other. The field lines 42 are detected by the sensor 14 arranged close to the magnet 24. FIG. 3 shows a magnet 24 with two North poles and two South poles, with magnetic field lines 42 extending from one North pole to one South pole. The field lines 42 are detected by the sensor 14 arranged close to the magnet 24.

It can be seen in FIGS. 2 and 3 that the magnetic field 42 weakens as the number of North and South poles in the magnet increases. However, a larger number of poles in the magnet allows the operating parameters of the shaft 15 to be measured more accurately. The presence of the sensor 14 close to the magnet 24 enables the sensor to detect the magnetic field without an intermediate unit even when the magnetic field is weak. The magnet 24 generates a magnetic field 42 with a constant strength, the direction of which varies with the angular position of the drive shaft 15. As a result, the magnetic field detected by the Hall effect sensor 14 will be a function of the angular position of the drive shaft 15. The electric signal delivered by the Hall effect sensor 14 therefore provides information about the speed and/or angular position of the drive shaft 15 and allows control over motor operation.

In one embodiment, there is a maximum distance of 4 mm between the sensor 14 and the magnet 24. At a distance of 4 mm, a 20 G sensor can be used for a four-pole ring. In a preferred embodiment, the distance between the sensor 14 and the magnet 24 is 2 mm. In this case, with the same sensor with a sensitivity of 20 G, the number of poles can be increased to 6, thus providing increased accuracy in the measurement of the position. For a solution with a flux concentrator, with a sensor with the same sensitivity and the same surface field of the magnet, only a bipolar ring can be allowed for correct operation as the weakness of the magnetic field does not allow for the magnetic field to be transmitted to the sensor. Other combinations of sensor strength, the number of poles in the magnet, and the distance between the sensor and the magnet are possible without departing from the scope of the invention.

The sensor 14 may, for example, be fixed to the housing 23, the supply terminals 22 or the collector 20, depending on the position of the magnet 24 along the axis of the drive shaft 15. The advantage is that the Hall effect sensor can be mounted whether or not the gear reduction unit 9 is assembled, as required, on the same standard gear reduction unit.

In one embodiment, the Hall effect sensor 14 is supported by the connector 12 for the transmission of power to the electric motor 11. For this, the motor housing 23 has an opening 25 near the supply terminals 22 to hold the connector 12 with a guide hole 41 inside which the sensor 14 is located. The connector 12 may comprise a printed circuit board 26 for a control device for the electric motor 11. The printed circuit board is capable of delivering a supply current for the motor 11. The current delivered by the circuit to the motor 11 passes through forked electrical contacts 32, that is, contacts on which one end is made up of a flexible clip with two symmetrical contact parts that curve inwards.

Advantageously, the connector 12 is removable. The connector 12 is held in position by conventional releasable fasteners (not shown). The advantage is that the connector 12 can be replaced by another connector with different control electronics. Another advantage is that the sensor 14 does not need to be mounted in the geared motor housing 23. Furthermore, it is not necessary to provide the connections for the sensor when the gear reduction unit is being produced, which simplifies its production.

Supporting the sensor by the removable power transmission connector allows for defects in the sensor to be rectified or for the type of sensor to be changed easily by removing the connector. This type of removable support also means that the position of the sensor can easily be adjusted or readjusted on the connector in order to optimize magnetic field detection by the sensor, which would be difficult if the sensor is fixed permanently in the geared motor.

The sensor 14 may be mounted on the printed circuit board 26 in the connector 12. This allows for the processing electronics (not shown) for the magnetic field detection by the sensor 14 to be fixed to the board 26. The printed circuit board 26 defines a plane P, with the sensor 14 being offset relative to the plane P. This allows the sensor 14 to be fixed to the board 26 and to be close to the magnet 24. The sensor 14 may be, for example, fitted with long connection tabs 35 as shown in FIG. 1. The length of the tabs 35 is chosen based on the spacing between the plane P and the magnet 24. For example, the tabs 35 may be 30 mm long.

The invention also relates to such a connector 12 in the gear reduction unit 9. In one embodiment, the connector 12 comprises a case 36 on which the releasable fastenings (not shown) are mounted. The case 36 contains the printed circuit board 26, the electrical contacts 32 and the Hall effect sensor 14. The case 36 may be manufactured by a molding process or other manufacturing process. In one embodiment, the connection between the case 36 and the contour of the opening 25 in the motor housing 23 is sealed so that the interior of the geared motor 10 is kept watertight; moreover, the seal between the interior of the case 36 and the interior of the geared motor 10 is preferably also maintained.

The use of the removable connector supporting the sensor allows all of the connections of the connector to be offset from the geared motor toward the connector, simplifying the construction of the geared motor.

The sensor 14 is preferably disposed in the guide hole 41 inside the case 36 to ensure a seal between the case 36 and the geared motor 10. The sensor 14 detects the magnetic field through the case 36. The case 36 protects the sensor 14. The distance between the sensor 14 and the magnet 24 is chosen so that the sensor 14 can be housed in the case 36 while still allowing the case 36 to be brought close to the magnet 24. The dimensions and position of the case 36 should take into account the production tolerances of the magnet 24 and the shaft 15 to prevent any contact between the case 36 and the magnet 24.

The connector according to the invention makes a single geared motor configuration suitable for a variety of applications. More particularly, the inventive structure compensates for standardized geared motors by using a connector that allows variation by changing the electronics on the printed circuit board and the type of Hall effect sensor. In other words, the connector can be varied so that the same, standardized geared motor can be used in different applications. This allows for the production of the gear reduction unit to be made simpler and less costly.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A gear reduction unit comprising:
   a drive shaft;
   an electric motor that rotatably drives the drive shaft;
   a reduction gear driven by the drive shaft;
   a geared motor housing that houses the reduction gear;
   a magnet disposed on the drive shaft;
   a connector that is removeably connected to the geared motor housing, wherein the geared motor housing is maintained permanently assembled to the electric motor, and wherein the connector includes electrical supply contacts for feeding current to the electric motor and a sensor disposed proximate to the magnet;
   a printed circuit board defining a plane; and
   a case that houses the printed circuit board and the sensor, wherein the sensor is fixed to the printed circuit board and offset relative to the plane defined by the printed circuit board, and the sensor is fitted with connection tabs that offset the sensor.

2. The gear reduction unit according to claim 1, wherein a distance between the sensor and the magnet is less than 4 mm.

3. The gear reduction unit according to claim 2, wherein the distance between the sensor and the magnet is 2 mm.

4. The gear reduction unit according to claim 1, wherein the magnet is a ring having at least one North pole and at least one South pole and is polarized transverse to a longitudinal axis of the drive shaft.

5. The gear reduction unit according to claim 4, wherein the magnet has a plurality of North poles and a plurality of South poles.

6. The gear reduction unit according to claim 1, wherein the connector includes a guide hole and the sensor is disposed in the guide hole.

7. The gear reduction unit according to claim 1, wherein the electric motor comprises a housing and an interface between the housing and the case forms a watertight seal.

8. The gear reduction unit according to claim 1, wherein the sensor is a Hall effect sensor.

9. The gear reduction unit according to claim 1, wherein the connection tabs fix the sensor to the printed circuit board.

10. The sear reduction unit according to claim 1, wherein the case includes a guide hole and the sensor is disposed in the guide hole.

11. The gear reduction unit according to claim 1, wherein the connector includes a releasable fastener that releasably secures the connector in the gear reduction unit.

* * * * *

UNITED STATES PATENT AND TRADEMARK OFFICE
CERTIFICATE OF CORRECTION

PATENT NO. : 7,141,904 B2  Page 1 of 1
APPLICATION NO. : 10/762587
DATED : November 28, 2006
INVENTOR(S) : Dan Mirescu It is certified that error appears in the above-identified patent and that said Letters Patent is hereby corrected as shown below:

ON TITLE PAGE:

Please add:

Item
(22) PCT filed:  May 20, 2003

Item
(86) PCT No.:  PCT/FR03/01521

§371 (c)(1)
(2), (4) date: Jan. 22, 2004

Item
(30)  Foreign Application Data
May 22, 2002  (FR)................................02 06 213

IN THE CLAIMS

Column 6, line 23: "sear" should be --gear--

Signed and Sealed this

Tenth Day of April, 2007

JON W. DUDAS
*Director of the United States Patent and Trademark Office*